(12) United States Patent
Lutter et al.

(10) Patent No.: US 6,778,073 B2
(45) Date of Patent: Aug. 17, 2004

(54) METHOD AND APPARATUS FOR MANAGING AUDIO DEVICES

(75) Inventors: Robert Pierce Lutter, Tacoma, WA (US); Dan Alan Preston, Bainbridge Island, WA (US)

(73) Assignee: Medius, Inc., Seattle, WA (US)

( * ) Notice: Subject to any disclaimer, the term of this patent is extended or adjusted under 35 U.S.C. 154(b) by 0 days.

(21) Appl. No.: 09/892,295

(22) Filed: Jun. 26, 2001

(65) Prior Publication Data

US 2002/0196134 A1 Dec. 26, 2002

(51) Int. Cl.[7] .............................................. B60Q 1/00
(52) U.S. Cl. ..................... 340/435; 340/539; 340/10.1; 340/825.72; 379/420.02; 381/86; 455/566; 455/569
(58) Field of Search ................................. 340/435, 539, 340/10.1, 10.4, 425, 426, 565, 566, 692, 903, 825.72; 455/566, 569, 575, 345; 379/420.02, 420.04; 381/86, 89

(56) References Cited

U.S. PATENT DOCUMENTS

| | | | | |
|---|---|---|---|---|
| 4,528,563 A | * | 7/1985 | Takeuchi | 340/903 |
| 5,552,773 A | * | 9/1996 | Kuhnert | 340/573 |
| 5,761,320 A | * | 6/1998 | Farinelli et al. | 381/81 |
| 5,872,508 A | * | 2/1999 | Taoka | 340/436 |
| 5,943,427 A | * | 8/1999 | Massie et al. | 381/17 |
| 6,097,285 A | * | 8/2000 | Curtin | 340/436 |
| 6,163,711 A | * | 12/2000 | Juntunen et al. | 455/557 |
| 6,243,450 B1 | | 6/2001 | Jansen et al. | |
| 6,275,231 B1 | * | 8/2001 | Obradovich | 345/349 |
| 6,294,987 B1 | * | 9/2001 | Matsuda et al. | 340/436 |

FOREIGN PATENT DOCUMENTS

| | | |
|---|---|---|
| WO | WO96/24229 | 8/1996 |
| WO | WO99/08436 | 2/1999 |
| WO | WO99/57662 | 11/1999 |
| WO | WO99/65183 | 12/1999 |
| WO | WO01/30061 | 4/2001 |
| WO | WO01/58110 | 8/2001 |

OTHER PUBLICATIONS

Luttge, Karsten; "E–Charging API: Outsource Charging to a Payment Service Provider"; IEEE; 2001 (pp. 216–222).

Product description of Raytheon RT Secure, "Embedded Hard Real–Time Secure Operating System", Copyright 2000, pp. 1–2.

Product description of Raytheon RT Secure, Copyright 2001, pp. 1–2.

Product description of Raytheon RT Secure, "Development Environment", Copyright 2001, pp. 1–2.

Product description of Raytheon Electronic Systems (ES), Copyright 2002, pp. 1–2.

(List continued on next page.)

Primary Examiner—Davetta W. Gioins
(74) Attorney, Agent, or Firm—Marger Johnson & McCollom, P.C.

(57) ABSTRACT

A vehicle audio system includes a wireless audio sensor configured to wirelessly detect different portable audio sources brought into the vehicle. Audio output devices are located in the vehicle for outputting audio signals from the different audio sources. A processor selectively connects the different audio sources to the different audio output devices. In another aspect, the audio system includes object sensors that detect objects located outside the vehicle. The processor generates warning signals that are output from the different audio output devices according to where the objects are detected by the object sensors.

21 Claims, 8 Drawing Sheets

OTHER PUBLICATIONS

H. Chung, L. Ojeda, and J. Borenstein, "Sensor Fusion for Mobile Robot Dead-reckoning with a Precision-calibrated Fiber Optic Gyroscope", 2001 IEEE International Conference on Robotics and Automation, Seoul, Korea, May 21–26, pp. 1–6.

A. Das, R. Fierro, V. Kumar, J. Ostrowski, J. Spletzer, and C. Taylor, "A Framework for Vision Based Formation Control", IEEE Transactions on Robotics and Automation, vol. XX, No. Y, 2001, pp. 1–13.

J. Takezaki, N. Ueki, T. Minowa, H. Kondoh, "Support System for Safe Driving—A Step Toward ITS Autonomous Driving—", Hitachi Review, vol. 49, No. 3, 2000, pp. 1–8.

S.G. Goodridge, "Multimedia Sensor Fusion for Intelligent Camera Control and Human–Computer Interaction", Dissertation submitted to the Graduate Faculty of North Carolina State University in partial fulfillment of the requirements for the degree of Doctor of Philosophy in Electrical Engineering, Raleigh, NC, 1997, pp. 1–5.

M. Chantler, G. Russel, and R. Dunbar, "Probabilistic Sensor Fusion for Reliable Workspace Sensing", pp. 1–14.

ISIS Project: Sensor Fusion, Linkoping University Division of Automatic Control and Communication Systems in cooperation with SAAB (Dynamics and Aircraft), 18 pages.

Hitachi Automated Highway System (AHS), Automotive Products, Hitachi, Ltd., Copyright 1994–2002, 8 pages.

Vehicle Dynamics Lab, University of California, Berkeley, funded by BMW, current members: D. Caveney and B. Feldman, "Adaptive Cruise Control", 17 pages.

Counterair: The Cutting Edge, Ch. 2 "The Evolutionary Trajectory The Fighter Pilot–Here to Stay?" AF2025 v3c8–2, Dec. 1996, pp. 1–7.

Counterair: The Cutting Edge, Ch. 4 "The Virtual Trajectory Air Superiority without an "Air" Force?" AF2025 v3c8–4, Dec. 1996, pp. 1–12.

TNO FEL Annual Review 1998: Quality works, 16 pages.

Boeing News Release, "Boeing Demonstrates JSF Avionics Multi–Sensor Fusion", Seattle, WA, May 9, 2000, pp. 1–2.

Boeing Statement, "Chairman and CEO Phil Condit on the JSF Decision", Washington, D.C., Oct. 26, 2001, pp. 1–2.

Ada 95 Transition Support—Lessons Learned, Sections 3, 4, and 5, CACI, Inc.–Federal, Nov. 15, 1996, 14 pages.

Joint Strike Fighter Terrain Database, ets–news.com "Simulator Solutions" 2002, 3 pages.

MSRC Redacted Proposal, 3.0 Architecture Development, pp. 1–43.

Powerpoint Presentation by Robert Allen—Boeing Phantom Works entitled "Real–Time Embedded Avionics System Security and COTS Operating Systems", Open Group Real–Time Forum, Jul. 18, 2001, 16 pages.

Green Hills Software, Inc., "The AdaMULTI 2000 Integrated Development Environment", Copyright 2002, 7 pages.

* cited by examiner

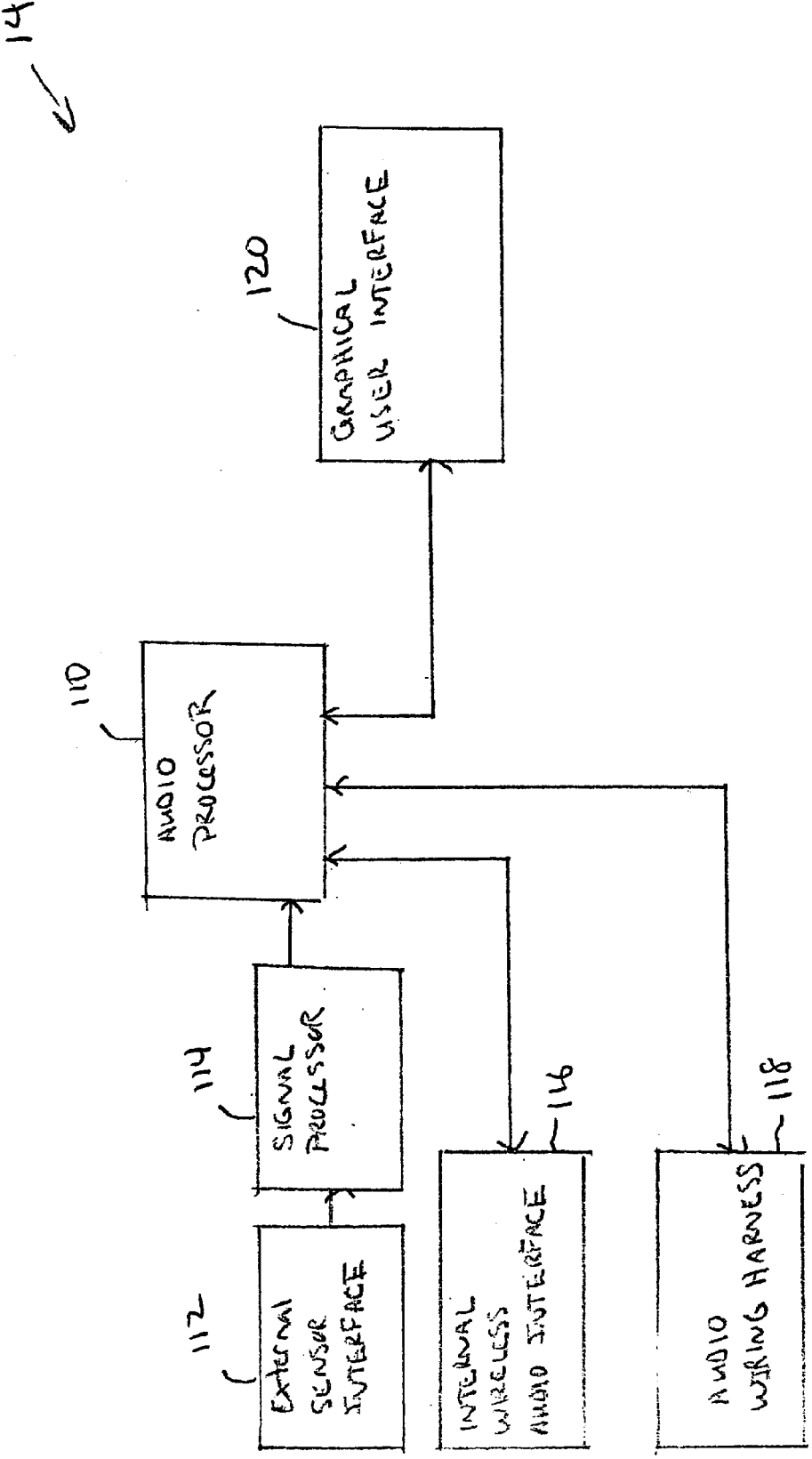

METHOD AND APPARATUS FOR MANAGING AUDIO DEVICES

BACKGROUND

Car audio systems typically comprise an in-dash stereo system. The in-dash stereo system has an amplifier and any combination of multiple audio sources that include a radio, cassette player and Compact Disc (CD) player. Speakers in the stereo system output audio signals from any of the different audio sources. Any other portable audio sources brought into the car cannot use the car speakers or amplifier system.

In-dash audio devices or portable audio devices brought into the car, can disrupt the attention of the car driver. For example, if the audio system is being played too loud, the car driver may not hear a siren or other outside noises. The audio system may therefore contribute to possible accidents.

Other types of audio devices, such as cellular telephones, are difficult to operate and hear while driving in a car. The car driver has to press the buttons on the cellular telephone and then hold the cell phone closely to the ear while also driving the car. It is also difficult to hear someone talking on a cellular telephone while other audio sources in the car are being played.

The present invention addresses this and other problems associated with the prior art.

SUMMARY OF THE INVENTION

A vehicle audio system includes a wireless audio sensor configured to wirelessly detect different portable audio sources brought into the vehicle. Audio output devices are located in the vehicle for outputting audio signals from the different audio sources. A processor selectively connects the different audio sources to the different audio output devices. In another aspect, the audio system includes object sensors that detect objects located outside the vehicle. The processor generates warning signals that are output from the different audio output devices according to where the objects are detected by the object sensors.

BRIEF DESCRIPTION OF THE DRAWINGS

FIG. 7 is a block diagram of the audio manager circuitry.

DETAILED DESCRIPTION

Figure 1:
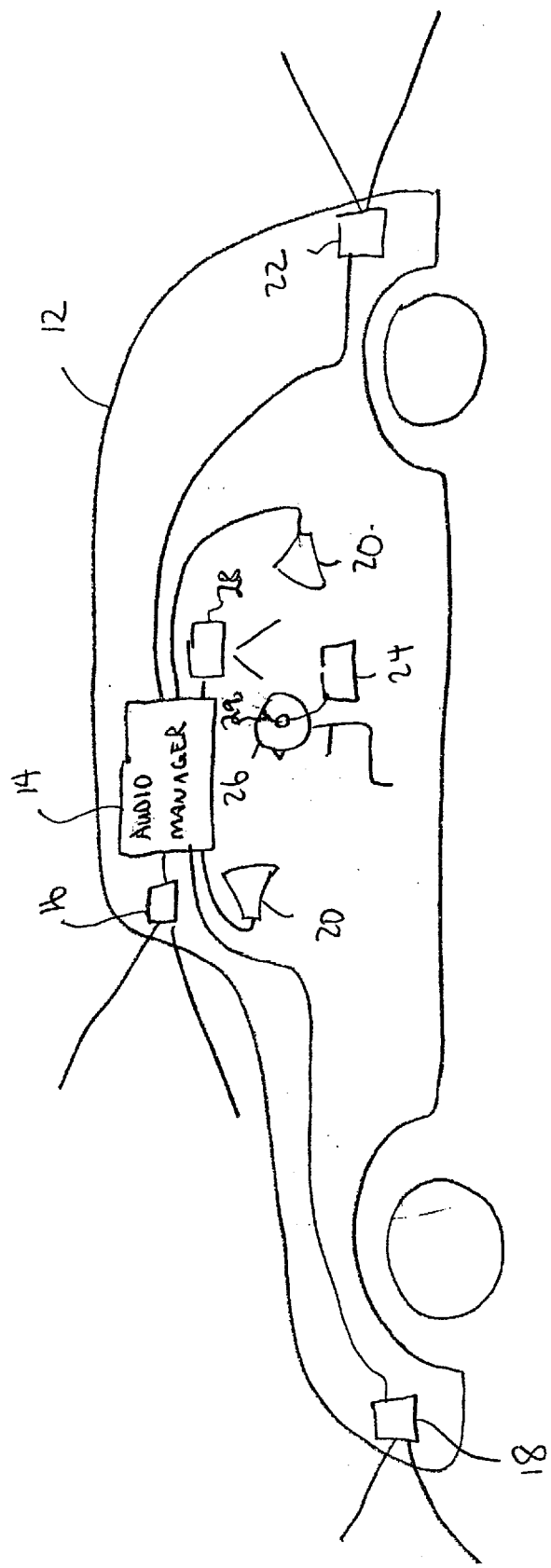
FIG. 1 is a diagram of a vehicle that includes an audio manager.

FIG. 1 shows an audio manager 14 located inside a vehicle 12. Multiple object detection sensors 16, 18, and 22 are located next to the front grill, front window and rear end, respectively, of vehicle 12. The sensors 16, 18, and 22 include infrared or radar antennas that detect objects anywhere around the perimeter of the vehicle 12. Of course other types of sensors can by used and installed in any location in the vehicle 12 for detecting objects. Multiple audio output devices 20 are located inside the vehicle. Typically the audio output devices 20 are speakers that are located in the dash, side doors, rear doors, or in any other location of vehicle 12.

A wireless audio sensor 28 wirelessly detects different portable audio sources brought into, or next to, the vehicle 12. For example, the audio sensor 28 can detect a portable Compact Disc (CD) player 24 that is brought into the vehicle 12 by a passenger 26. The CD player 24 is connected to a headset 29 that attaches over the ears of the passenger 26. The earphones 29 can also be detected separately by the audio sensor 28. A processor in the audio manager 14 receives communication data and audio data detected by the sensor 28 and then selectively connects different audio sources detected in the vehicle 12 to the different audio output devices 20.

Figure 2:
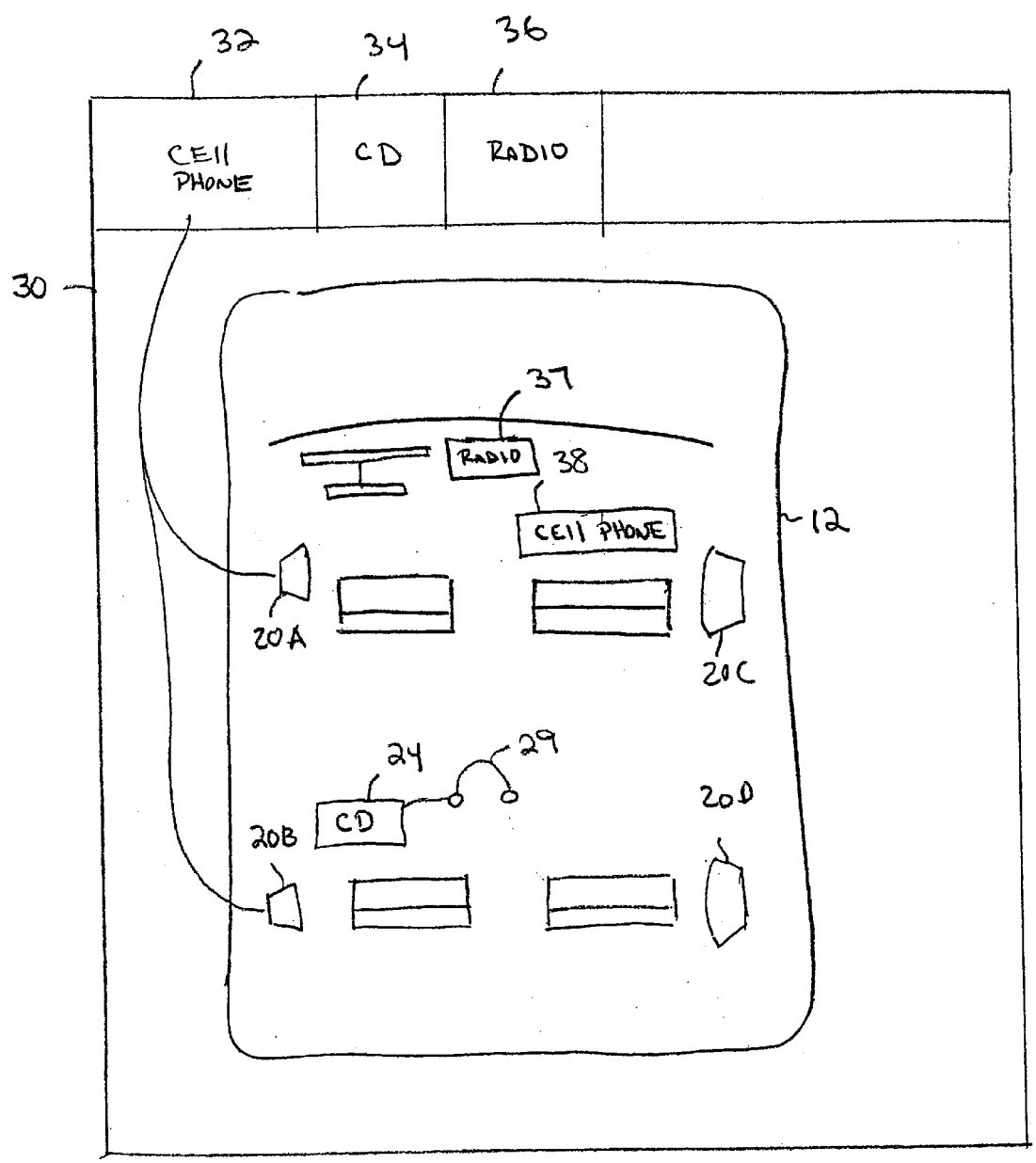
FIG. 2 is a diagram of a graphical user interface that is controlled by the audio manager.

FIG. 2 shows a Graphical User Interface (GUI) 30 that is coupled to the audio manager 14 shown in FIG. 1. The GUI 30 in combination with the audio manager 14 automatically display the audio sources detected by the wireless sensor 28 or hardwired to the audio manager. In one example, there are three different audio sources that are detected by sensor 28 inside the vehicle 12 (FIG. 1). A first audio source comprises a cellular telephone that is represented by an icon 32 on the GUI 30. The sensor 28 also detects the CD player 24 previously shown in FIG. 1. The CD player 24 is represented by icon 34 on GUI 30. In this example, the audio manager 14 also detects a car radio that is represented by icon 37 on GUI 30. The audio sources can be any portable wireless device or any hardwired device connected by wires to the vehicle's electrical system.

The audio manager 14 detects and communicates with the different wireless audio sources using any one of a variety of wireless communication protocols, such as Bluetooth or IEEE 802.11. The audio manager 14 communicates with the different wireless audio sources using the open communication protocol described in co-pending U.S. patent application Ser. No. 09/841,753 entitled: OPEN COMMUNICATION SYSTEM FOR REAL-TIME MULTIPROCESSOR APPLICATIONS filed on Apr. 24, 2001 and co-pending U.S. patent application Ser. No. 09/841,915 entitled: METHOD AND APPARATUS FOR DYNAMIC CONFIGURATION OF MULTIPROCESSOR SYSTEM filed on Apr. 24, 2001 which are both herein incorporated by reference.

The audio manager 14 can also detect different portable audio output devices and any audio output devices contained in the audio output device. For example, the CD player 24 when detected by sensor 28 notifies the audio manger 14 that there is also an attached headset 29. The audio output devices could also be a speaker in the CD player, other speakers in the vehicle 12, or portable speakers that have no associated audio source.

The audio manager 14 displays the different audio output devices on GUI 30. For example, vehicle installed car speakers 20A–20D are displayed in their permanent locations in the side doors of vehicle 12. The CD player 24 and headset 28 are shown located in the left rear seat of vehicle 12. The cell phone 38 is shown located in the front passenger seat. The radio 37 is shown in the front dash of vehicle 12.

The position of the different portable audio sources and audio output devices are determined using known position locating circuitry located in sensor 28.

The audio manager 14 allows a user to selectively connect the different audio sources to the different audio output devices by dragging and dropping icons 32, 34, and 36 over the different icons 20A–20D, 29, and 38 representing the different audio output devices. For example, to output a cellular telephone conversation over the car speakers 20A–20D and the headset 29, an operator simply drags icon 32 over the speaker icons 20A–20D and the headset icon 29. The audio manager 14 accordingly will direct the audio output from the cellular telephone 38 to the car speakers and the headset 29.

In another example, the audio data played by the CD player 24 is output from the car speakers by dragging the icon 34 over icons 20A–20D. If the car speakers are currently connected to the car radio 37, the audio manager 14 disconnects the audio output from the car radio 37 from the speakers 20A–20D and connects the audio output from the CD player 24 to the car speakers 20A–20D. In yet another example, the audio signal from the CD player 24 is connected only to the rear speakers by dragging and dropping the icon 34 over speaker icons 20B and 20D.

Figure 3:
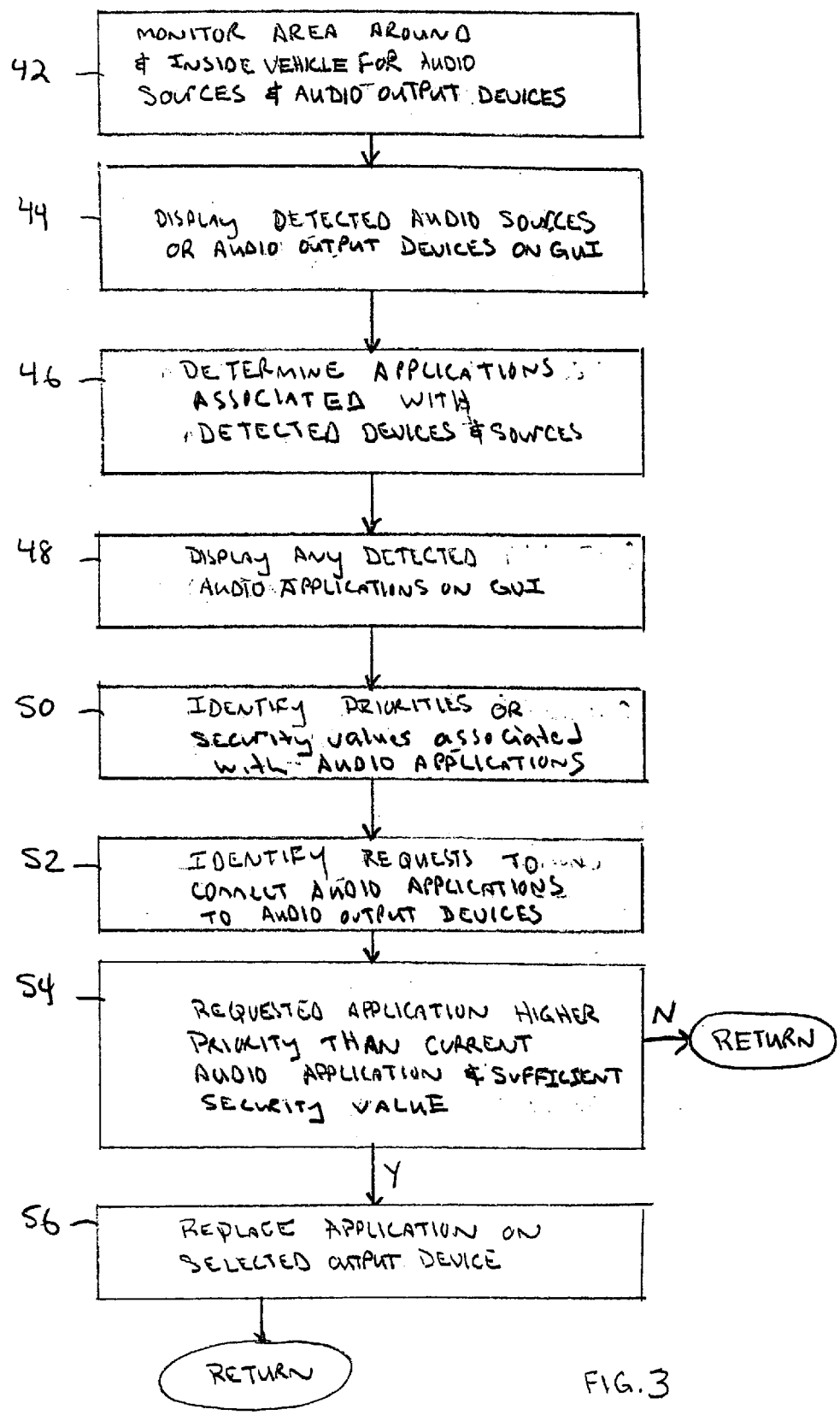
FIG. 3 is a flow diagram showing how the audio manager operates.

Referring to FIG. 3, the audio manager 14 in block 42 monitors the area around and inside the vehicle 12 for any audio sources or audio output devices that may be transmitting a wireless signal. Any detected audio sources or audio output devices are displayed on the GUI 30 in block 44. The data manager in block 46 then determines what applications are associated with the different audio sources. For example, one detected audio source may include a CD player application and another audio source may include a tape player and MP3 player application. The applications associated with the different audio sources are displayed on the GUI in block 48.

The data manager 14 in block 50 identifies any priorities and security values associated with the identified audio applications. In block 52, the data manager 14 identifies requests to output different ones of the audio sources to different ones of the audio output devices. The selected audio application may have a higher priority than the audio application that is currently connected to the selected audio output device. If the priority of the requesting audio application is the same or higher than the currently connected audio application, then the audio manager 14 in block 56 replaces the audio application currently coupled to the audio output device with the selected audio application. If the requesting audio application has a lower priority than the audio application currently coupled to the audio output device, then the audio manager in block 54 will not connect the new audio application.

The audio application priorities are used by the data manager to determine what audio sources are allowed to be circumvented by other audio sources. For example, an audio source that generates a collision warning signal may have a high priority that can override lower audio applications, such as audio applications that only play music. As soon as the collision warning signal is no longer generated, the previous audio source is reconnected to the audio output device.

In another embodiment, a car radio may be playing a news weather report from the car speakers. A user of the GUI 30 may move a CD audio source over the vehicle speaker icons 20A–20D (FIG. 2). If the radio weather report contains a higher priority value than a priority value associated with the music played over the portable CD player, the CD player will not be allowed to output audio signals to the car speakers. After the weather report is finished, the next radio program output from the car radio may have the same or a lower priority than the CD player. For example, the next program coming from the vehicle radio may be music. Because the music from the CD player has the same or higher priority than the music currently being played by the radio, the data manager 12 redirects the music output from the CD player over the car speakers.

In yet another application, some audio devices or applications may not have a sufficient security value for accessing any of the audio output devices in vehicle 12. The data manager 14 reads a security value in block 50, if any, transmitted by the audio source. If the security value is below some value established by the audio manager 14, or if the portable audio source has no security value, then the audio source is not acknowledged by the audio manager 14 and not allowed to be connected to the audio output devices in block 54.

The priority and security operations of the data manager are explained in further detail in co-pending U.S. patent application Ser. No. 09/841,753 entitled: OPEN COMMUNICATION SYSTEM FOR REAL-TIME MULTIPROCESSOR APPLICATIONS filed on Apr. 24, 2001 and co-pending U.S. patent application Ser. No. 09/841,915 entitled: METHOD AND APPARATUS FOR DYNAMIC CONFIGURATION OF MULTIPROCESSOR SYSTEM filed on Apr. 24, 2001.

Object Collision Detection

Figure 4:
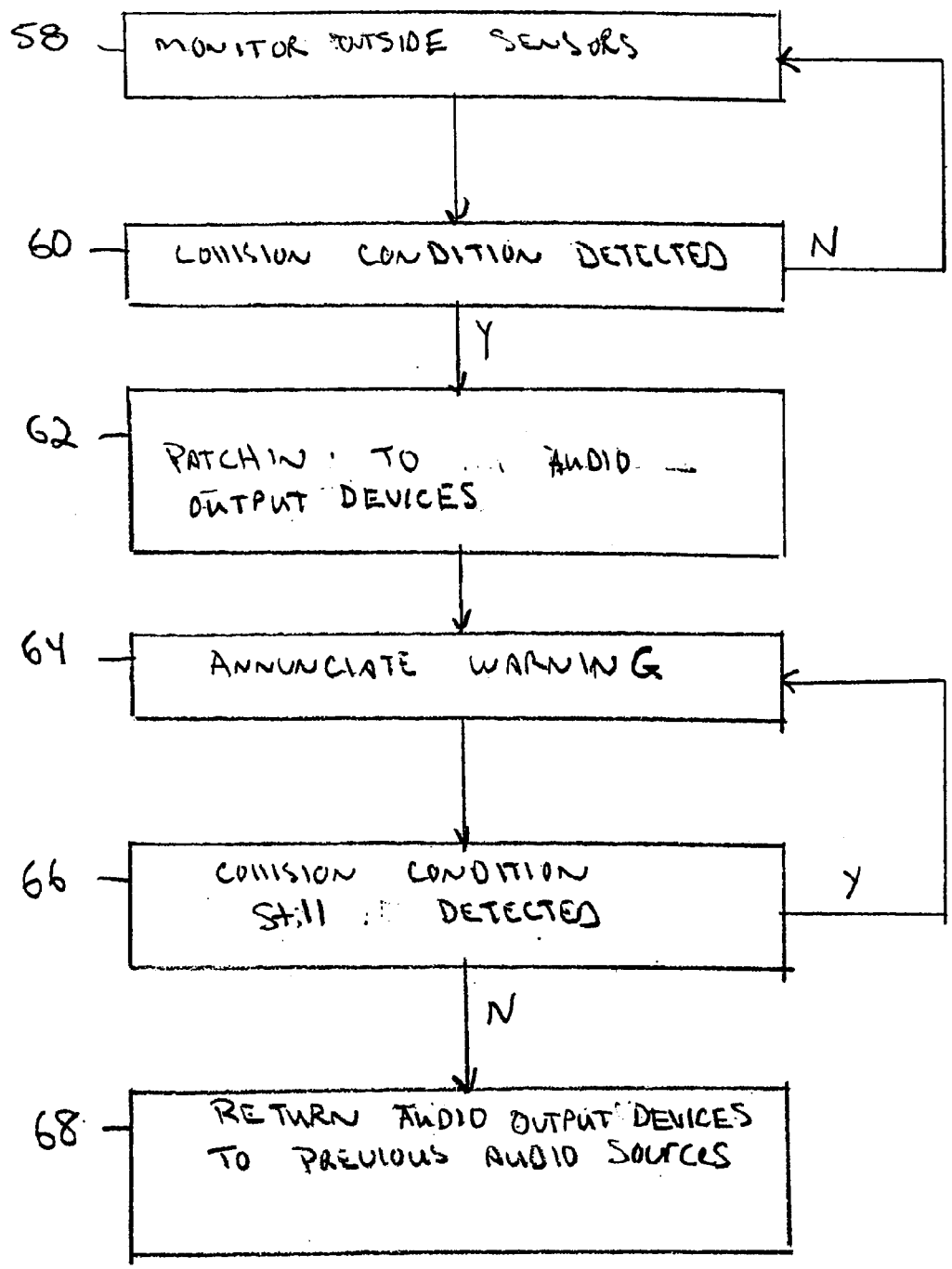
FIG. 4 is a flow diagram showing how the audio manger operates in conjunction with object sensors.

Referring to FIGS. 1 and 4, the audio manager 14 also integrates object collision detection into the vehicle audio system. As described above in FIG. 1, multiple object detection sensors 16, 18 and 22 are connected to the audio manager 14 and are positioned around the vehicle 12 in different locations. Each sensor 16, 18 and 22 can detect objects around the perimeter of the vehicle 12.

Referring specifically to FIG. 4, the audio manager 14 in block 42 receives the sensor data from the external sensors 16, 18 and 22. The audio manager 14 includes image processing algorithms that detect, and possibly identify, different objects that are within the range of the sensors 16, 18 or 22. A signal processor determines velocity vectors for both the detected object and the vehicle 12. The velocity vectors include the position, direction, and speed. Based on the velocity vectors, it might be determined that a possible collision condition exists between the detected object and the vehicle 12.

If a collision condition is determined in block 60, the audio manager in block 62 patches-in a warning signal to some or all audio output devices in block 62. The warning signal is annunciated by the audio output devices in block 64. Because audio output devices can be wirelessly coupled to different audio sources, the audio manager 14 can output the collision warning to any portable device that may be located in or around the vehicle 12. For example, the audio manager 14 can patch-in the collision warning signal to headset 28 in the portable CD player 24 (FIG. 1). That way, every passenger in the vehicle 12 is notified of the collision condition regardless of whether the passenger is listening to an in-dash radio, talking on a cellular telephone, or listening to music on the portable CD player. The collision warning is annunciated in block 64 until the collision condition is no longer detected in block 66. When the collision condition no longer exists, the audio manager in block 68 reconnects the audio sources that were previously connected to the audio output devices before the collision condition was detected.

Figure 5:
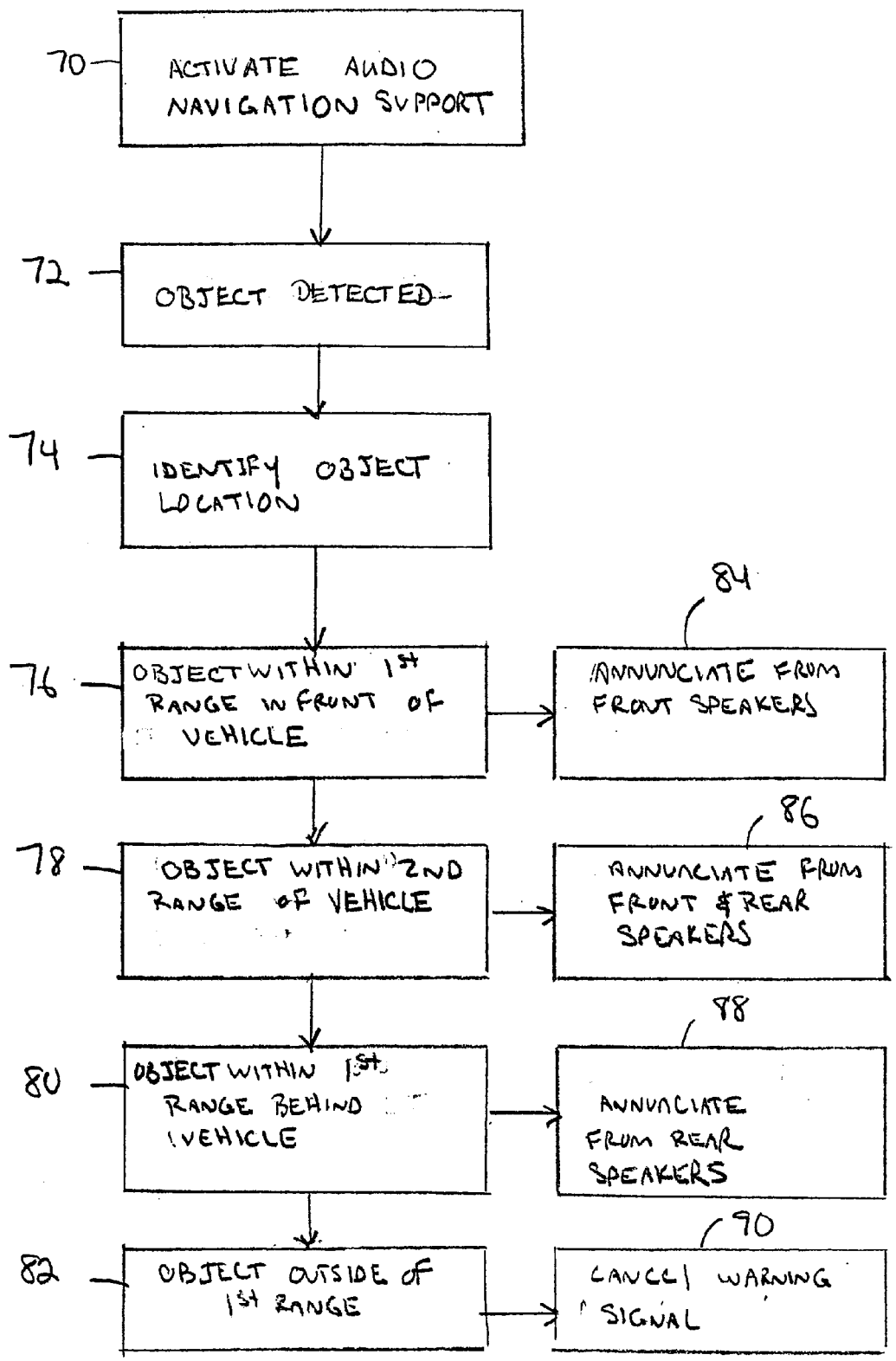
FIG. 5 is a flow diagram showing how the audio manager annunciates the location of objects identified by the object detection sensors.

FIG. 5 shows how the audio manager 14 provides 3-D audible signaling that helps a car operator identify where objects are detected in relationship to vehicle 12. This feature provides additional audio navigation support to the car operator that help avoid collisions. In block 70 the audio navigation support function is activated. This may be done manually by the vehicle operator or automatically whenever the vehicle is turned on. The audio manager 14 is notified that an object has been detected in block 72. The audio manager 14 determines a current location associated with the detected object in block 74. The audio manager 14 determines the object location according to which sensors detected the object and according to the location of the object identified in the sensor data.

If the detected object is within a first range in front of the vehicle 12 in block 76, the audio manger 14 outputs a warning signal from the front speakers 20A and 20C (FIG. 2) in block 84. If the detected object is detected within a second range inside the first range in block 78, then the warning signal in block 86 is output in both the front speakers 20A and 20C and the rear speakers 20B and 20D of the vehicle 12. If the object is detected within the first range behind the vehicle in block 80, then the warning signal is annunciated only from the rear speakers 20B and 20D in block 88. When the object is detected outside of the first range in block 82, the warning signal is cancelled by the audio manager 14 in block 90.

The audio manager dynamically varies which vehicle speakers output the warning signal according to where the object is currently being detected. This provides the car driver with a 3-D audible indication of where the object is located. Even if not displayed, the car driver has some indication of where the object is located and where to turn to avoid a collision. Because the audio manager provides position information, the driver has a better and faster ability to see and then avoid possible collisions.

Figure 6A:
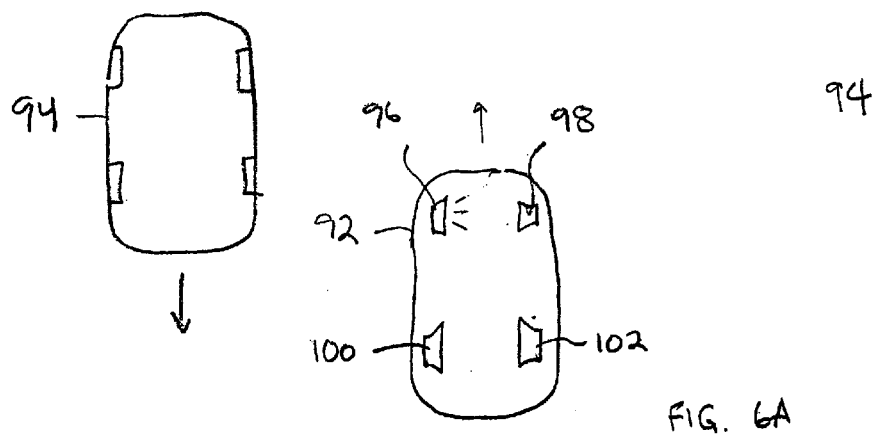
FIGS. 6A–6C are diagrams showing how the audio manager annunciates a warning signals according to a location of another vehicle.
Figure 6B:
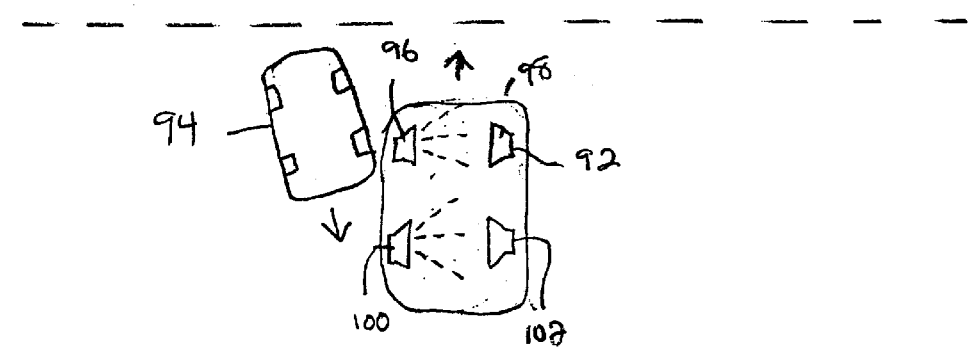
Figure 6C:
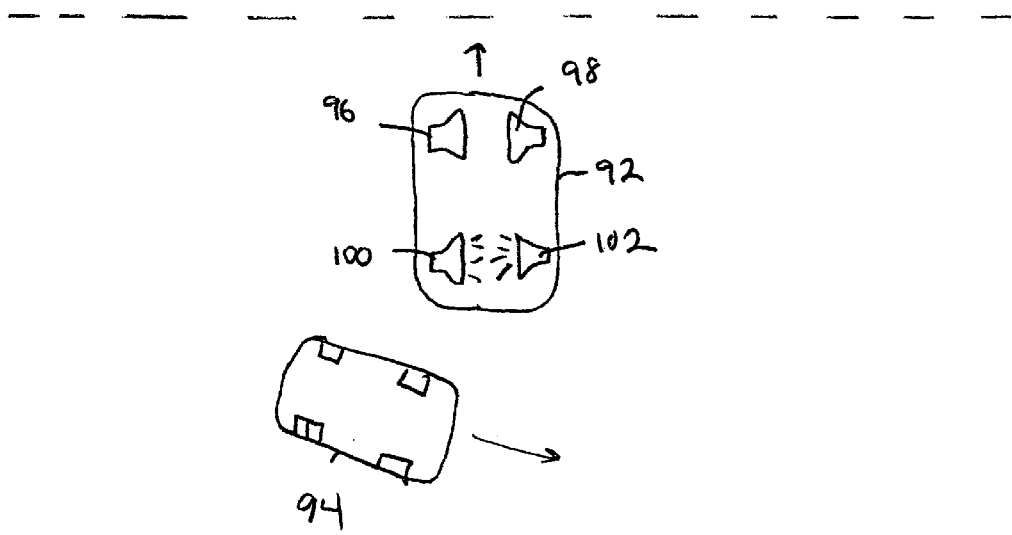

FIGS. 6A–6C show another example of how the audio manager 14 provides 3-D collision notification. Vehicle 92 includes a front left speaker 96, a front right speaker 98, a rear left speaker 100, and a rear right speaker 102. The vehicle 92 is moving in a northerly direction and a second vehicle 94 is moving in an opposite southerly direction.

Vehicle 94 is detected by sensors (not shown) on vehicle 92. At the position of vehicle 94 in FIG. 6A, the audio manager 14 generates a warning signal only in speaker 92. In FIG. 6B, the vehicle 94 moves closer along the left side of vehicle 92. The audio manager 14 accordingly outputs the warning signal in both speakers 96 and 100. Because the vehicle 94 is detected in closer proximity to vehicle 92 in FIG. 6B, the audio manager 14 increases the volume of the warning signal output from speakers 96 and 100. In FIG. 6C the vehicle 94 is detected moving away and along a rear end of vehicle 92. The audio manager 14 accordingly directs the warning signal out from the rear speakers 100 and 102 in vehicle 92. Since the vehicle 94 is moving away from vehicle 92, the volume of the warning signal is reduced and eventually fades off until the vehicle 94 is outside of a predetermined range of vehicle 92.

The dynamic 3-D movement of the warning signals to different speakers and at different volume levels proportional to a distance of the detected object 94 from the vehicle 92 provides a Doppler effect similar to that experienced by a person hearing a whistle from a train as it travels toward and then away from the person. This provides an audible sensory effect of movement for the detected object that allows the listener to better identify collision conditions.

FIG. 7 shows in more detail the functional components of the audio manager 14. A processor 110 receives sensor data from an external sensor interface 112. The sensor data received over sensor interface 112 is processed by a digital signal processor 114. The signal processor 114 identifies and locates objects in the received sensor data. The signal processor 114 also identifies kinematic state information for the objects detected in the sensor data. The kinematic state information may include the speed, direction, location and acceleration of the detected objects. Signal processing algorithms implemented in the signal processor 114 for detecting, identifying and determining the kinematic state for objects detected from radar, infrared, or other types of sensor data is well known and is therefore not described in further detail.

A wireless audio interface 116 detects and communicates wirelessly with different wireless audio devices such as CD players, MP3 players, tape players, cellular telephones, televisions, DVD players, and any other device that can output wireless audio stream. The interface 116 detects and communicates either through an associated audio source or independently with different audio output devices such as speakers. An audio wiring harness 118 couples the processor 110 to any other audio devices that are hardwired in the vehicle. A graphical interface 120 is used by a vehicle operator to manually select different audio sources for connecting to different audio output devices.

Figure 8:
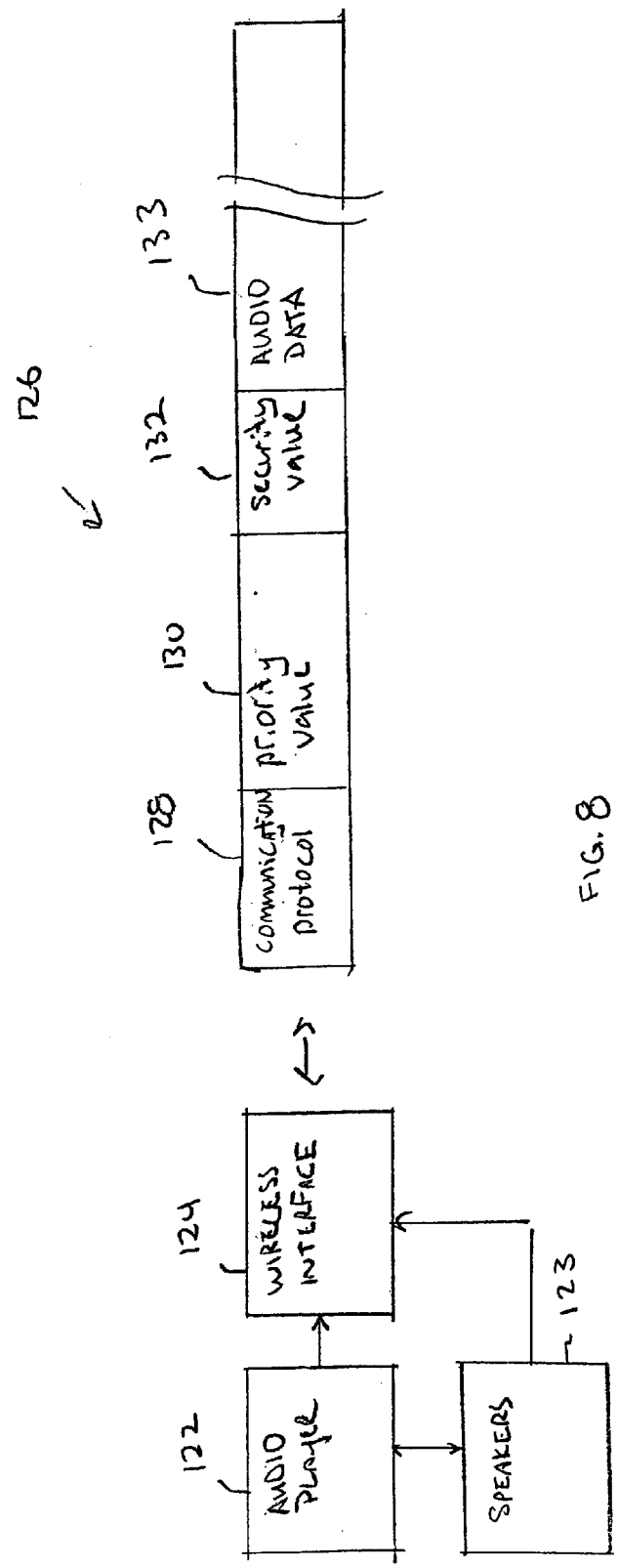
FIG. 8 is a diagram of audio source interface circuitry and a sample audio data packet transmitted between one of the audio sources and the audio manager.

FIG. 8 shows in more detail the functional blocks of an audio source that communicates with the audio manager 14. An audio player 122 is connected to speakers 123. A wireless interface 124 communicates with the audio interface 116 of the audio manager 14 shown in FIG. 7. As mentioned above, the communication protocol used between the audio device and the audio manager 14 can be any wireless protocol used for transmitting data, such as Bluetooth or IEEE 802.11.

The wireless interface 124, in one example, sends out the audio data in packets 126 that include headers 128 that are used to conduct the wireless communication protocol with the audio manager 14. A priority value 130 assigns a priority to audio data 133. A security value 132 assigns a security value to the audio data 133.

It should also be understood that the audio manager described above can be utilized for environments other than in a vehicle. For example, the audio manger can be used in a home or office environment. The audio manager can be located in a Personal Computer (PC) of other audio circuitry, such as in a home entertainment center or home stereo. The audio sources can include any portable or hardwired audio device that is brought into the vicinity of the data manager audio sensor. In one example, there may be multiple audio sensors located in different rooms or offices. The graphical user interface may be the screen of a PC, a television coupled to the audio manager or any other screen used in a home entertainment system. The audio output devices can be any stereo speakers, television speakers, telephone speakers, PC speakers, etc. located in the home or office.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles claim is made to all modifications and variation coming within the spirit and scope of the following claims.

What is claimed is:

1. A vehicle audio system, comprising:
 a wireless audio sensor configured to wirelessly detect different audio sources brought into or next to a vehicle and identify the detected audio sources on a display;
 audio output devices for outputting audio data; and
 a processor for selectively connecting a first one of the identified audio sources identified on the display to a first set of the audio output devices and selectively connecting a second one of the audio sources to a second set of the audio output devices.

2. A vehicle audio system according to claim 1 wherein the display is a graphical user interface that allows selection of any of the displayed different audio sources for outputting to any of the audio output devices.

3. A vehicle audio system according to claim 2 wherein the graphical user interface automatically displays icons representing the wireless audio output devices brought into or next to the vehicle.

4. A vehicle audio system according to claim 3 wherein the different audio sources are selectively connected to the different audio output devices by dragging and dropping icons displayed on the graphical user interface representing the different audio sources over icons representing the audio output devices.

5. A vehicle audio system according to claim 1 including object sensors connected to the processor.

6. A vehicle audio system according to claim 1 wherein the processor detects portable audio output devices moved within a vicinity of the vehicle and patches in a warning signal output by the portable audio output devices.

7. A vehicle audio system according to claim 5 wherein the processor causes the audio output devices to output a warning signal from multiple audio output devices at the same time simulating a three-dimensional Doppler effect associated with a direction of an object detected by the object sensors.

8. A vehicle audio system according to claim 7 wherein the warning signal is generated according to a velocity vector associated with the detected object.

9. A vehicle audio system according to claim 8 wherein the processor automatically interrupts other audio sources with the warning signal when the object comes within a specified distance and direction of the vehicle.

10. A vehicle audio system, comprising:
 a wireless audio sensor configured to wirelessly detect different audio sources brought into or next to a vehicle;
 wireless audio output devices for outputting audio data having assigned priority values; and
 a processor for selectively connecting the different audio sources to the audio output devices according to the assigned priority values for the audio data.

11. A vehicle audio system, comprising:
 a wireless audio sensor configured to wirelessly detect different audio sources brought into or next to a vehicle;
 wireless audio output devices for outputting audio data having assigned security values; and
 a processor for selectively connecting the different audio sources to the audio output devices according to the assigned security values for the audio data.

12. A vehicle audio system according to claim 9 wherein one of the audio sources comprises a cellular telephone or a portable music player that generates an output signal that is detected by the wireless audio sensor when moved inside or next to the vehicle, the processor outputting the warning signal through speakers in the cellular telephone and portable music player.

13. A vehicle audio system according to claim 12 wherein at least some of the speakers in the cellular telephone or portable music player are located in headphones.

14. A method for annunciating information in a vehicle, comprising:
 detecting an object outside a vehicle;
 generating a warning signal identifying the detected object; outputting the warning signal to a plurality of speaker locations in the vehicle but varying the relative volume of the warning signal among the plurality of speaker locations to audibly indicate where in a 360 degree circle surrounding the vehicle the detected object is positioned; and
 wirelessly detecting mobile audio sources that are moved into, or next to, the vehicle and automatically displaying the mobile audio sources along with any hardwired audio sources and any audio output devices on a graphical user interface.

15. A method according to claim 14 including selecting different audio sources for outputting to different selectable ones of the audio output devices by dragging icons on the graphical user interface representing the audio sources over icons on the graphical user interface representing the audio output devices.

16. A method according to claim 14 including automatically detecting and displaying icons for the mobile audio sources coming into a detectable range of a sensor that detects wireless signals output by the mobile audio sources and automatically removing the displayed icons when the mobile audio sources move outside the detectable range of the sensor.

17. A method according to claim 16 including:
 detecting speakers in the mobile audio sources;
 displaying the speakers on the graphical user interface; and
 connecting any of the audio sources detected in the vehicle to any of the detected speakers in the mobile audio devices by dragging icons on the graphical user interface representing the audio sources over icons on the graphical user interface representing the speakers.

18. A method for annunciating information in a vehicle, comprising:
 detecting an object outside a vehicle;
 generating a warning signal identifying the detected object;
 outputting the warning signal to a plurality of speaker locations in the vehicle but varying the relative volume of the warning signal among the plurality of speaker locations to audibly indicate where in a 360 degree circle surrounding the vehicle the detected object is positioned; and automatically and wirelessly detecting portable audio sources moved within a vicinity of the vehicle and automatically patching-in the warning signal to the portable audio sources when a collision condition is detected.

19. A vehicle audio system, comprising:

a processor for selectively connecting different audio sources to audio output devices, the different audio sources assigned priority values and the processor coupling the audio sources to the audio output devices according to the priority values wherein the processor automatically detects and displays portable audio output devices brought into or next to the vehicle and outputs warning signals through the portable audio output devices.

20. A vehicle audio system, comprising:

a processor for selectively connecting different audio sources to audio output devices, the different audio sources outputting audio data in packets that have assigned security values for the audio data and the processor coupling the audio sources to the audio output devices according to the security values associated with the audio data, wherein the processor causes the audio output devices to output a warning signal according to a velocity vector derived for an object detected by an object sensor; and a wireless sensor that identifies portable audio output devices moved inside or next to the vehicle.

21. A vehicle audio system according to claim 20 wherein the processor outputs the warning signal to the portable audio output devices.

* * * * *